United States Patent [19]

Capuano

[11] 4,273,175
[45] Jun. 16, 1981

[54] THREAD CONVOLUTION

[75] Inventor: Terry D. Capuano, Hinckley, Ohio

[73] Assignee: The Lamson & Sessions Co., Cleveland, Ohio

[21] Appl. No.: 26,879

[22] Filed: Apr. 4, 1979

[51] Int. Cl.³ .............................................. F16B 39/02
[52] U.S. Cl. ..................................... 411/168; 411/310
[58] Field of Search ..................... 151/22, 21 B, 14 R; 85/46, 47, 48, 32 T

[56] References Cited

U.S. PATENT DOCUMENTS

| Re. 27,678 | 6/1973 | Orlomoski | 151/21 B UX |
| 113,557 | 4/1871 | Pearson | 151/22 X |
| 1,829,017 | 10/1931 | Saben | 151/37 |
| 2,330,511 | 9/1943 | Money | 151/21 B X |
| 3,176,746 | 4/1965 | Walton | 151/22 |
| 3,339,389 | 9/1967 | Mosow | 151/22 X |
| 3,972,359 | 8/1976 | Thomas | 151/22 |
| 3,972,360 | 8/1976 | Cadinallader | 151/22 |
| 3,972,361 | 8/1976 | Ollis | 151/22 |
| 3,982,575 | 9/1976 | Ollis et al. | 151/22 |

FOREIGN PATENT DOCUMENTS 1356778 6/1974 United Kingdom .
1498874 1/1978 United Kingdom .
1514205 6/1978 United Kingdom .

Primary Examiner—J. Franklin Foss
Attorney, Agent, or Firm—Yount & Tarolli

[57] ABSTRACT

An improved thread convolution cooperates with a mating thread convolution to prevent reverse rotation between the thread convolutions in a direction tending to loosen a fastener. In order to prevent reverse rotation between the two thread convolutions while enabling them to be rotated in a forward direction to tighten the fastener, the improved thread convolution has a resiliently deflectable spring portion which forms part of a flank of the thread convolution. During relative rotation between the two thread convolutions in a direction tending to tighten the fastener, the spring portion is deflected from an extended position to a retracted position under the influence of a flank of the mating thread convolution. This enables relative rotation to occur between the two thread convolutions without gouging or excessive scratching of the flank of either of the two thread convolutions. Upon initiation of reverse rotation between the two thread convolutions, the spring portion moves outwardly and penetrates the flank of the mating thread convolution to prevent continued rotation in the reverse of loosening direction between the two thread convolutions.

6 Claims, 9 Drawing Figures

THREAD CONVOLUTION

BACKGROUND AND FIELD OF THE INVENTION

This invention relates generally to a thread convolution and more specifically to an improved lock thread convolution which retards relative rotation between it and a mating thread convolution in one direction while enabling them to freely rotate in the opposite direction relative to each other.

Fasteners are frequently utilized in environments in which the fasteners are subjected to loads or vibrations which tend to loosen the fasteners. In an effort to prevent loosening of a threaded fastener, one or more thread convolutions of the fastener have been provided with flanks having serrations or other types of projections which engage a mating thread convolution to prevent relative rotation between the thread convolutions in a reverse direction, that is in a direction tending to loosen the fastener. Various prior art fasteners having locking thread convolutions of this general type are disclosed in U.S. Pat. Nos. 3,982,575; 3,972,361; 3,972,359; 3,339,389; 3,176,746; 113,557; and U.S. Pat. No. Re. 27,678. The projections or serrations formed on the flanks of these known lock thread convolutions are relatively stiff and tend to gouge or excessively scratch the flank surface of the mating thread convolution when the two thread convolutions are interconnected.

SUMMARY OF THE PRESENT INVENTION

The present invention relates to an improved lock thread convolution which cooperates with a second or mating thread convolution. In order to enable the lock thread convolution to engage the mating thread convolution without damaging it and to subsequently prevent loosening rotation between the two thread convolutions, the flank of the lock thread convolution is provided with a resiliently deflectable spring portion.

When the lock thread convolution is being turned relative to the mating thread convolution in a direction tending to tighten a fastener, a side surface of the spring portion is disposed in flat abutting engagement with the flank surface of the mating thread convolution. Therefore the spring portion is wiped along the surface of the mating thread convolution in a manner which precludes gouging or excessive scratching of the mating thread convolution. Upon initiation of reverse rotation between the two thread convolutions, a pointed end of the spring portion of the lock thread convolution pierces the flank of the mating thread convolution to prevent continued loosening rotation between the two thread convolutions.

Once the lock thread convolution has engaged the mating thread convolution, the spring portion on the flank of the lock thread convolution is effective to apply an axially directed force against the flank of the mating thread convolution. This axial force retards vibrating movement between the two thread convolutions.

Accordingly, it is an object of this invention to provide a new and improved thread convolution having a retainer element which enables relative rotation to occur between the thread convolution and a mating thread convolution in one direction and which retards relative rotation between the two thread convolutions in the opposite direction.

Another object of this invention is to provide a new and improved thread convolution as set forth in the next preceding object and wherein the retainer element includes a spring portion which is effective to penetrate the flank surface of the mating thread convolution to prevent undesired rotation between the two thread convolutions.

Another object of this invention is to provide a new and improved thread convolution which cooperates with a mating thread convolution and wherein a flank of the improved thread convolution has a side surface area which is disposed in flat abutting engagement with a flank surface area of the mating thread convolution to prevent the formation of discontinuities in the flank of the mating thread convolution during relative rotation between the two thread convolutions in one direction and wherein the side surface area in the flank of an improved thread convolution pierces the flank of mating thread convolution upon initiation of relative rotation between the two thread convolutions in a second direction to thereby retard continued rotation between the two thread convolutions in the second direction.

BRIEF DESCRIPTION OF THE DRAWINGS

The foregoing and other objects and features of the present invention will become more apparent to one skilled in the art to which it pertains upon a consideration of the following description taken in combination with the accompanying drawings wherein.

DESCRIPTION OF ONE SPECIFIC PREFERRED EMBODIMENT OF THE INVENTION

Figure 1:
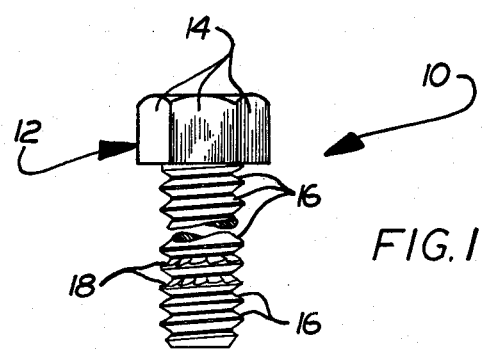
FIG. 1 is a fragmentary illustration of a fastener having a lock thread convolution constructed in accordance with the present invention.

A fastener or bolt 10 constructed in accordance with the present invention is illustrated in FIG. 1 and has a head end portion 12 with wrenching flats 14. An axially projecting shank of the fastener 10 is provided with a plurality of external standard thread convolutions 16 and a plurality of external lock thread convolutions 18. The standard thread convolutions 16 have straight flanks which are sized in a manner to freely engage a cooperating standard internal thread convolution.

In accordance with a feature of the present invention, the lock thread convolutions 18 are effective to enable the fastener 10 to be rotated in a clockwise direction to tightly engage a mating internal thread convolution without gouging or scraping of the mating thread convolution. This enables the fastener 10 to be tightened without damaging the mating thread convolution.

Figure 2:
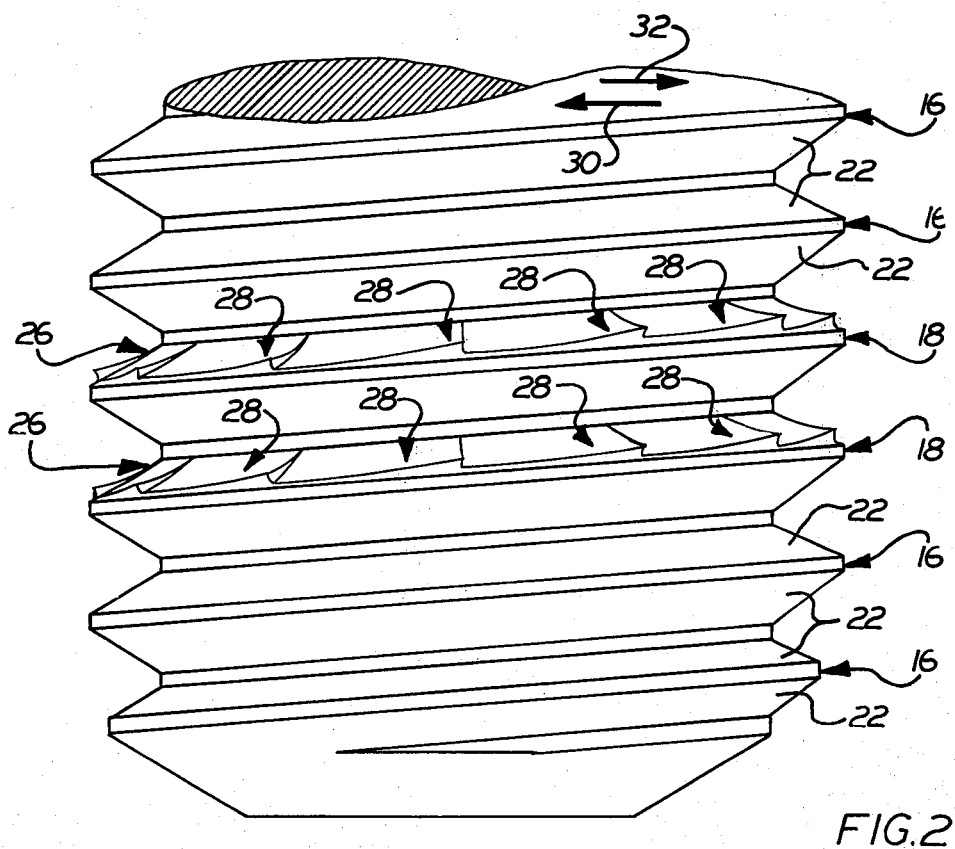
FIG. 2 is an enlarged fragmentary sectional view of a portion of the fastener of FIG. 1 and illustrating the manner in which a plurality of spring portions are formed on a flank of the lock thread convolution.

Upon the application of a load or vibratory force tending to loosen the fastener, the lock thread convolutions 18 cooperate with the mating internal thread convolutions to prevent relative rotation between the lock thread convolutions and the mating thread convolutions in a direction to loosen the fastener 10. In order to prevent reverse rotation between the internal and external thread convolutions in a direction tending to loosen the fastener 10, the lock thread convolutions 18 have flanks 26 (FIG. 2) which are provided with retainer elements 28. The retainer elements 28 are constructed so that they do not interfere with the mating thread convolution during rotation of the fastener 10 in a direction tending to tighten the fastener, that is in the direction of the arrow 30 in FIG. 2. However, upon the application of forces to the fastener 10 tending to rotate the fastener in a reverse direction, that is in the direction indicated by the arrow 32 in FIG. 2, the retainer elements 28 interfere with the mating thread convolution in such a manner as to prevent relative rotation between the two thread convolutions in a direction tending to loosen the fastener.

Each of the identical retainer elements 28 is integrally formed with the flank portion 26 of the lock thread convolution 18. The retainer element 28 (FIG. 3) includes a resiliently deflectable spring finger or portion 36 which is an axially protruding portion of the flank. The spring finger or portion 36 has a pointed end 38 which is defined by the intersection of an arcuate main side surface 40, a radially outer minor side surface 42 and a generally radially extending minor surface 44 (see FIGS. 3, 4 and 5).

Figure 3:
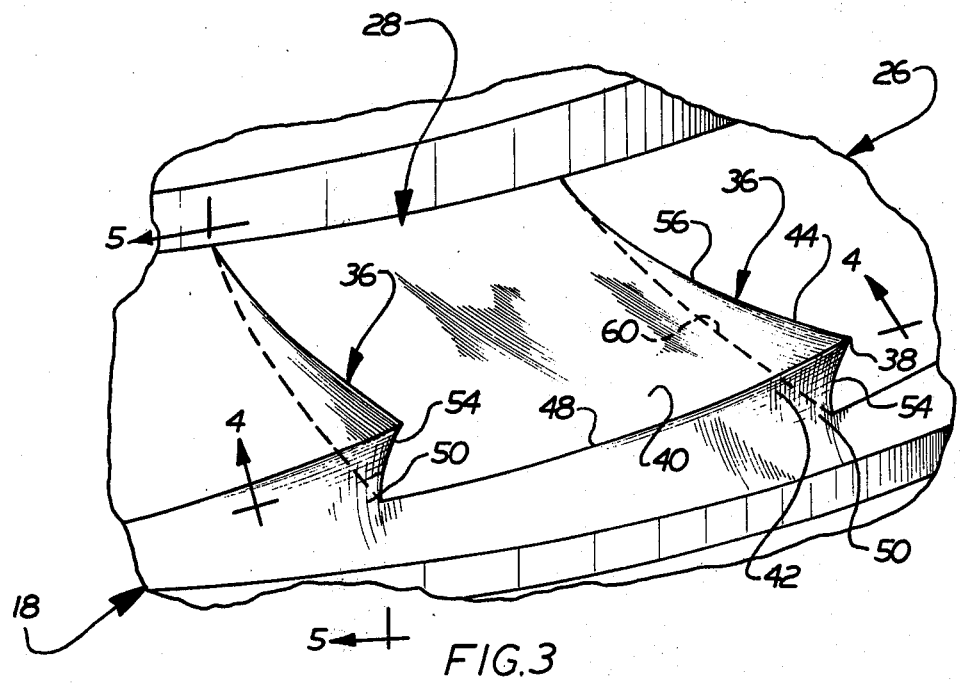
FIG. 3 is an enlarged fragmentary view further illustrating the construction of spring portions which are disposed on the flank of the lock thread convolution of FIG. 2.
Figure 4:
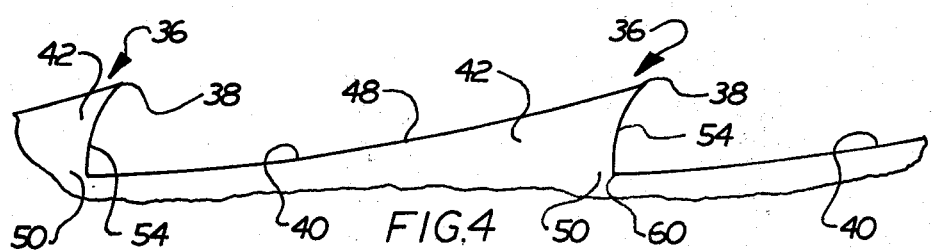
FIG. 4 is a somewhat schematicized view taken along the line 4—4 of FIG. 3 and illustrating the configuration of a radially outer edge of a spring portion.

The resiliently outer minor side surface 42 and major side surface 40 intersect at an arcuate radially outer edge 48 which extends from the pointed end 38 of one spring finger 36 to the base 50 of a next adjacent spring finger 36 which is offset from the first spring finger in a direction of tightening rotation of the fastener 10 (see FIGS. 3 and 4). An arcuate and generally axially extending edge 54 extends inwardly from the intersection of the edge 48 with the point 38 to the base 50 of the spring finger 36 (see FIGS. 3 and 4). In addition, a generally radially inwardly extending arcuately curved edge 56 intersects the two edges 48 and 54 at the point 38. The intersection between the major side surface 40 of the next adjacent rightward spring finger and the spring finger 36 is formed at an arcuately curving generally radially extending corner 60 (see FIGS. 3-5).

The spring finger 36 is resiliently deflectable toward the center of the lock thread convolution 18. Thus, the edges 48, 54 and 56 and the side surfaces 40, 42 and 44 of the spring finger 36 are concave in configuration. This results in the spring finger tapering outwardly from the base 50 to the pointed end 38. In addition, it should be noted that the pointed end 38 overhangs the major side surface 40 of the next succeeding spring finger in the direction of loosening rotation of the fastener 10, that is toward the right as viewed in FIG. 4.

Figure 5:
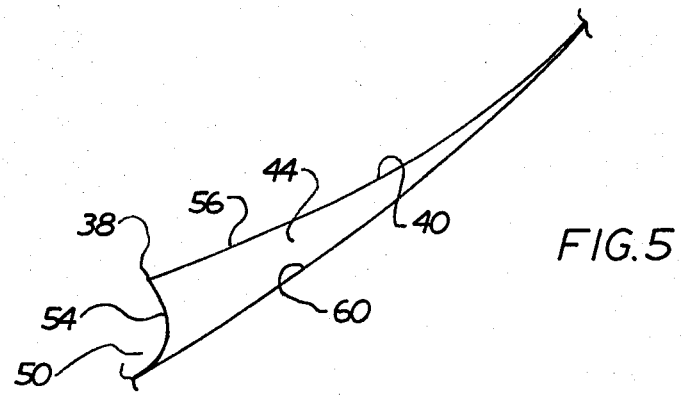
FIG. 5 is a somewhat schematicized view taken along the line 5—5 of FIG. 3 and illustrating the configuration of a generally radially extending edge of a spring portion.

By forming the spring finger in the manner illustrated in FIGS. 3-5, the pointed end portion 38 of the spring finger 36 is disposed axially outwardly of a straight line 64 (FIG. 6) extending between a sharp crest 66 of the thread convolution 18 and a sharp root 68 of the thread convolution. In addition, a portion of the major side surface 40 of the spring finger 36 is disposed axially inwardly of the line 64. Thus, the pointed end portion 38 of the spring finger 36 is disposed adjacent to the crest 70 of the locking thread convolution 18 and is disposed on a side of the line 64 which is opposite from a smooth lower flank surface 74 of the locking thread convolution 18. The radially inner portion of the major side surface 40 which is adjacent to the root 76 of the thread convolution 18 is disposed on an axially inner side of the line 64 toward the smooth flank 74 of the thread convolution.

The volume of metal in the locking thread convolution 18 is the same as the volume of metal in a standard thread convolution 16. Therefore, the locking thread convolution 18 can be formed with suitable dies which will move metal from a location adjacent to the root 76 of the lock thread convolution 18 toward the point 38 adjacent to the crest 72 of the lock thread convolution. In this regard, it should be noted that the metal forming the spring finger 36 was displaced from a portion of the locking thread convolution 18 which is radially inwardly of the pitch diameter 80 of the lock thread convolution.

Figure 6:
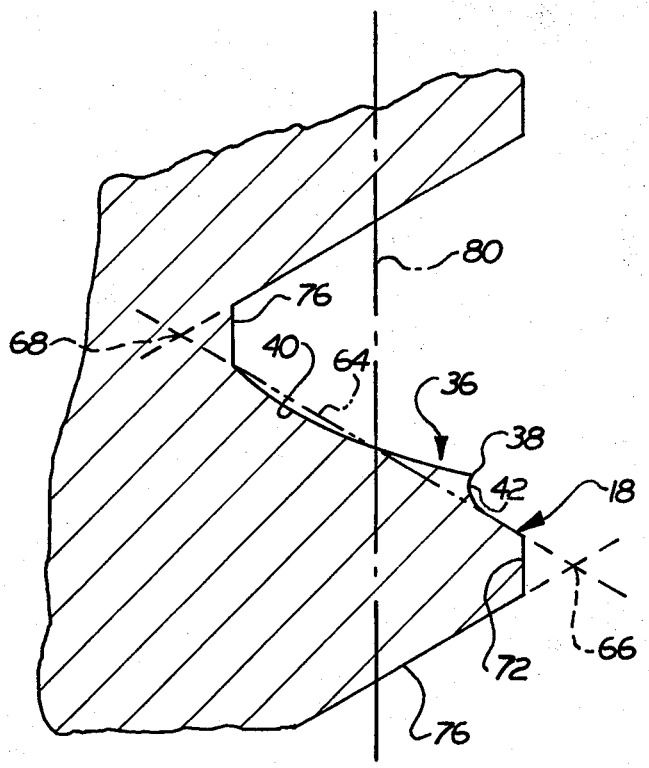
FIG. 6 is a fragmentary radial cross sectional view further illustrating the configuration of a lock thread convolution having a spring portion constructed in accordance with FIGS. 3-5.
Figure 7:
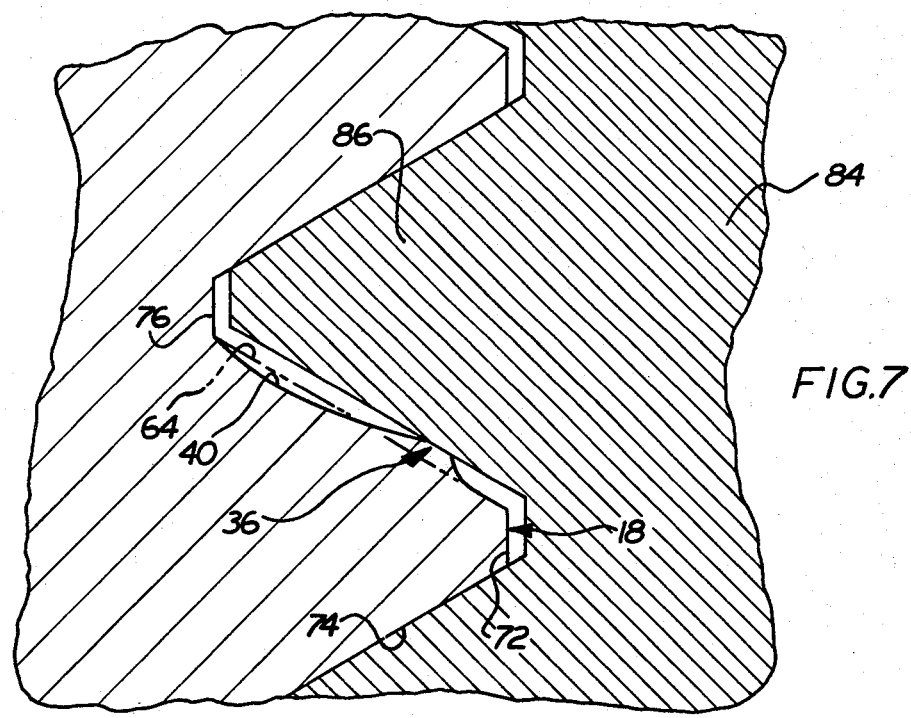
FIG. 7 is an enlarged fragmentary radial sectional view, generally similar to FIG. 6, illustrating the manner in which the lock thread convolution cooperates with a mating standard thread convolution.

When the fastener 10 engages an internally threaded member 84 in the manner shown in FIG. 7, the standard thread convolution 16 at the leading end portion of the fastener 10 (see FIGS. 1 and 2) is readily turned into free engagement with a standard external thread convolution 86 formed on the member 84. As the lock thread convolution 18 moves into engagement with the internal thread convolution 86, the spring finger is resiliently deflected from the fully extended position of FIGS. 3 and 6 to the retracted position illustrated in FIGS. 7 and 8.

Figure 8:
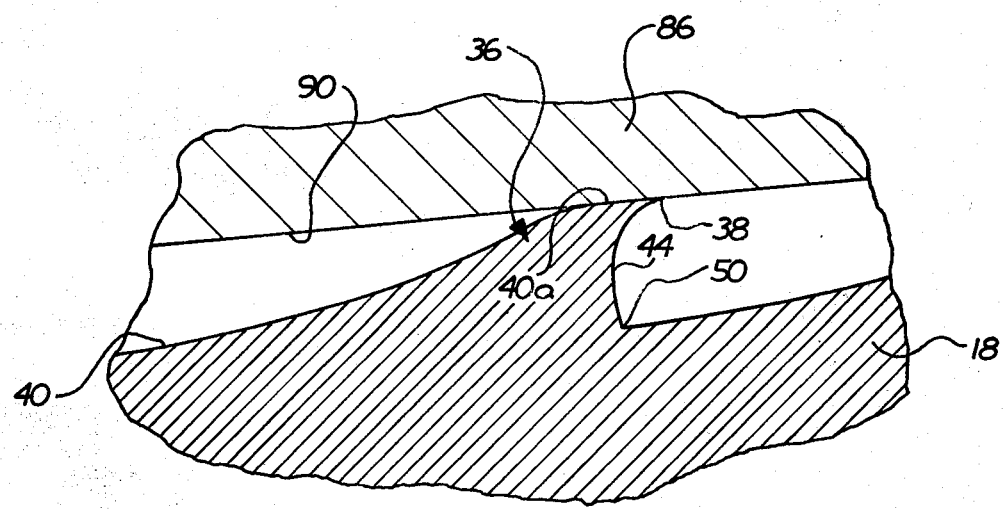
FIG. 8 (on sheet three of the drawings) is an enlarged fragmentary sectional view illustrating the manner in which a spring portion of the lock thread convolution engages the flank of a mating thread convolution during relative rotation between the two thread convolutions in a direction tending to tighten the fastener.

When the lock thread convolution 18 engages the standard internal thread convolution 86, the major outer side surface 40 of the spring finger 36 engages the smooth flank surface 90 of the internal thread convolution in the manner shown in FIG. 8. As the fastener 10 is tightened, the locking thread convolution 18 moves toward the left (as viewed in FIG. 8) relative to the internal thread convolution 86. This results in the resilient spring finger 36 being resiliently deflected inwardly toward the central portion of the locking thread convolution 18 under the influence of forces applied against the major side surface 40 of the spring finger 36 by the flank surface 90 of the internal thread convolution 86. At this time a portion of the major side surface 40 of the spring finger 36 is disposed in flat abutting engagement with the flank surface 90 of the standard internal thread convolution 86.

During continued movement of the lock thread convolution 18 toward the left (as viewed in FIG. 8), the side surface 40 of the resiliently deflected spring finger 36 merely slides along the flank surface 90 of the internal thread convolution 86 and does not form discontinuities in the flank by gouging or digging into the flank. Of course, if the spring portion 36 was relatively rigid and could not be readily deflected under the influence of forces applied against the surface 40 by the flank 90 of the mating thread convolution 86, the spring portion 36 would tend to tear a groove in the side of the flank 86. The formation of such a groove would be detrimental to both thread strength and the obtaining of a locking action between the external and internal thread convolutions 18 and 86.

Once the fastener 10 has been fully tightened, it is desirable to prevent loosening of the fastener due to reverse rotation between the internal thread convolution 86 and the lock thread convolution 18, that is rightward movement (as viewed in FIG. 8) or counterclockwise rotation between the internal thread convolution and the lock thread convolution. To prevent undesired loosening movement between the two thread convolutions, upon initiation of reverse or loosening rotation between the two thread convolutions the pointed end 38 of the spring portion 36 pierces the flank surface 90 of the internal thread convolution 86. As this occurs, the spring portion 36 pivots about its base 50 from the retracted position of FIG. 8 toward the fully extended position of FIGS. 3 and 6. This movement of the spring portion 36 occurs as the pointed end 38 pierces through the flank surface 90 and penetrates into the flank of the threaded convolution 86.

The obtaining of this locking action is promoted by the natural resilience of the spring portion 36. This natural resilience causes the pointed end 38 of the spring portion to be continuously pressed against the flank surface 90 of the internal thread convolution 86. Therefore upon initiation of reverse rotation between the two thread convolutions, the pointed end 38 digs into the flank of the internal thread convolution.

Ideally, the spring portion 36 should penetrate the flank of the thread convolution 86 without any appreciable relative movement between the internal thread convolution 86 and the external lock thread convolution 18. However, it is believed that due to lubricant on the flank surface 90 of the internal thread convolution or other causes, there may be a slight amount of reverse rotation between the internal thread convolution 86 and the external thread convolution 18 before the spring finger 36 digs into or penetrates the flank of the internal thread convolution 86. The extent of this initial rotation is minimized due to the fact that the natural resilience of the spring portion 36 is continuously pressing the pointed end 38 of the spring portion 36 against the flank surface 90.

When the fastener 10 is being rotated to move the internal thread convolution 18 toward the left (as viewed in FIG. 8), the pointed end 38 of the spring portion 36 is trailing so that it is deflected rearwardly, that is toward the right as viewed in FIG. 8, by the flank surface 90 of the thread convolution 86. This deflection of the pointed end 38 prevents the formation of a groove in the flank of the standard thread 86. If such a groove was formed, there would probably be less resistance to reverse rotation of the lock thread.

Upon the application of forces tending to cause reverse rotation between the internal thread convolution 86 and the lock thread convolution 18, the pointed end 38 becomes the leading end of the spring portion 36. Due to the fact that the pointed end 38 of the spring portion 36 is leading upon initiation of relative rotation between the lock thread convolution 18 and the internal thread convolution 86, the natural resilience of the spring portion 36 enables the point 38 to form an opening in the flank surface 90 to pierce the surface and penetrate into the flank of the internal thread convolution 86. It should be noted that as the forces tending to cause loosening rotation of the fastener 10 are increased, the spring portion 36 digs further and further into the internal thread convolution 86 to increase the rotation retarding forces which are transmitted between the internal thread convolution 86 and the lock thread convolution 18 through the spring portion 36.

Figure 9:
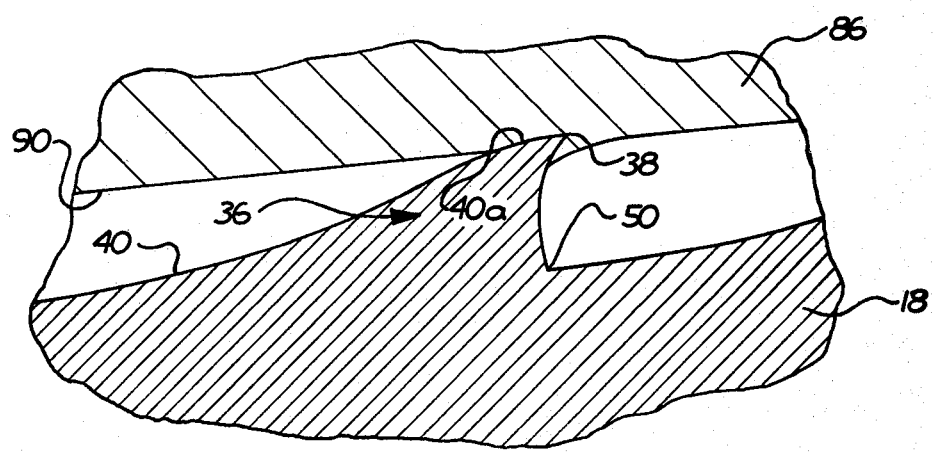
FIG. 9 is an enlarged fragmentary sectional view, generally similar to FIG. 8, illustrating the manner in which the spring portion of the lock thread convolution penetrates the flank of the mating thread convolution to retard relative rotation between the two thread convolutions in a direction tending to loosen the fastener.

As the spring portion 36 penetrates the flank of the internal thread convolution 86, a portion 40a of the major side surface 40 changes in its angular orientation relative to the flank surface 90 of the internal thread convolution 86. Thus, prior to initiation of loosening rotation between the internal thread convolution 86 and lock thread convolution 18, the surface area 40a is disposed in flat abutting engagement with the flank surface 90 and therefore extends parallel to the flank surface (see FIG. 8). However, once the pointed end 36 has pierced the flank surface of the internal thread convolution 86, the angular orientation of the surface area 40 relative to the flank surface 90 changes as the spring portion penetrates the flank of the internal thread convolution 86. Thus, the surface area 40a moves from the orientation shown in FIG. 8 to the orientation shown in FIG. 9 in which the surface area 40a extends at an acute angle to the flank surface 90.

In view of the foregoing, it is apparent that the present invention relates to an improved lock thread convolution 18 which cooperates with a second or mating thread convolution 86. In order to enable the lock thread convolution 18 to engage the mating thread convolution 86 without damaging it and to subsequently prevent loosening rotation between the two thread convolutions, the flank 26 of the lock thread convolution is provided with a resiliently deflectable spring portion 36.

When the lock thread convolution 18 is being turned relative to the mating thread convolution 86 in a direction tending to tighten the fastener 10, a side surface 40 of the spring portion 36 is disposed in flat abutting engagement with the flank surface 90 of the mating thread convolution. Therefore the spring portion 36 is wiped along the surface 90 of the mating thread convolution in a manner which precludes gouging or excessive scratching of the mating thread convolution. Upon initiation of reverse rotation between the two thread convolutions 18 and 86, a pointed end 38 of the spring portion 36 of the lock thread convolution 18 pierces the flank of the mating thread convolution to prevent continued loosening rotation between the two thread convolutions.

Once the lock thread convolution 18 has engaged the mating thread convolution, the spring portion 36 on the flank of the lock thread convolution is effective to apply an axially directed force against the flank of the mating thread convolution (FIG. 8). This axial force retards vibrating movement between the two thread convolutions.

Having described one specific preferred embodiment of the invention, the following is claimed:

1. A first thread convolution adapted to engage a second thread convolution, said first thread convolution comprising first and second flank portions which extend from opposite sides of a crest of said first thread convolution to a root of said first thread convolution, and retainer means for enabling relative rotation to occur between said first and second thread convolutions in a first direction and for retarding relative rotation between said first and second thread convolutions in a second direction which is opposite from said first direction, said retainer means including a resiliently deflectable spring portion which forms part of said first flank portion, said spring portion being integrally formed with said first thread convolution and being resiliently deflectable toward the second flank portion from an extended position to a retracted position under the influence of forces applied to said spring portion by a flank surface of the second thread convolution, said spring portion including surface means for penetrating the flank surface of the second thread convolution and for effecting movement of said spring portion from the retracted position toward the extended position upon relative rotation between said first and second thread convolutions in the second direction, said spring portion being effective to transmit forces retarding relative rotation in the second direction between said first and second thread convolutions upon movement of said spring portion from the retracted position toward the extended position after having penetrated the flank surface of the second thread convolution, said surface means including a pointed end portion which is disposed radially outwardly of the pitch diameter of said first thread convolution and is disposed radially inwardly of the crest of said first thread convolution, said pointed end portion extending along the flank of the second thread convolution when said spring portion is in the retracted position and extending into the flank of the second thread convolution when said spring portion moves toward the extended position upon relative rotation between said first and second thread convolutions in the second direction.

2. A first thread convolution as set forth in claim 1 wherein said surface means has a side surface area which is disposed in flat abutting engagement with a flank surface of the second thread convolution when said spring portion is in the retracted position, said side surface area of said spring portion being moved relative to the second thread convolution to a position extending at an acute angle to the flank surface of the second thread convolution when said spring portion moves from the retracted position toward the extended position.

3. A first thread convolution as set forth in claim 2 wherein at least a portion of the side surface area of said surface means penetrates the flank of the second thread convolution upon movement of said spring portion from the retracted position toward the extended position.

4. A first thread convolution as set forth in claim 1 wherein said spring portion has an arcuate edge which is a trailing edge of said spring portion during relative rotation between said first thread convolution and said second thread convolution in the first direction and is a leading edge of said spring portion during relative rotation between said first thread convolution and said second thread convolution in the second direction, said arcuate edge extending from a location on a first side of a line extending from a sharp root to a sharp crest of said first thread convolution to a location disposed on a second side of the line extending from the sharp root to the sharp crest of said first thread convolution, the portion of said arcuate edge which is disposed on the first side of the line extending between the sharp root and sharp crest of said first thread convolution being located on a side of the line toward said second flank portion and being located adjacent to the root of said first thread convolution and the portion of said arcuate edge which is disposed on the second side of the line being located on a side of the line away from said second flank portion and being located adjacent to the crest of said first thread convolution.

5. A first thread convolution adapted to engage a second thread convolution, said first thread convolution comprising a flank portion which extends between a crest and root of said first thread convolution, said flank portion including a resiliently deflectable spring portion having a side surface area which is disposed in flat abutting engagement with a flank surface area of the second thread convolution to prevent the formation of discontinuities in the flank surface of the second thread convolution during relative rotation between said first and second thread convolutions in a first direction, said side surface area piercing through the flank surface of the second thread convolution to penetrate the second thread convolution and form a discontinuity in the flank surface of the second thread convolution upon initiation of relative rotation between said first and second thread convolutions in a second direction to thereby retard relative rotation between said first and second thread convolutions in the second direction, said side surface area of said spring portion being disposed in a plane which extends parallel to the flank surface of the second thread convolution during relative rotation between said first and second thread convolutions in the first direction, said side surface area of said spring portion being disposed in a plane which extends at an acute angle to the flank surface of the second thread convolution upon initiation of relative rotation between said first and second thread convolutions in the second direction and piercing of the flank surface of the second thread convolution.

6. A first thread convolution as set forth in claim 5 wherein said spring portion includes a pointed projection upon which said side surface is disposed, said pointed projection has a base and a free end portion, said free end portion being deflected in the second direction relative to said base by the flank of the second thread convolution during relative rotation between said first and second thread convolutions in the first direction, at least part of said free end portion of said pointed projection being disposed within the flank of the second thread convolution upon initiation of relative rotation between said first and second thread convolutions in the second direction.

* * * * *

UNITED STATES PATENT AND TRADEMARK OFFICE
CERTIFICATE OF CORRECTION

PATENT NO. : 4,273,175
DATED : June 16, 1981
INVENTOR(S) : Terry D. Capuano

It is certified that error appears in the above-identified patent and that said Letters Patent are hereby corrected as shown below:

Column 7, line 53, delete "first".

In Fig. 6, change the reference numeral "72" to --70--;
change the reference numeral "76" (at bottom of figure) to --74--.

Signed and Sealed this

First Day of September 1981

[SEAL]

Attest:

Attesting Officer

GERALD J. MOSSINGHOFF

Commissioner of Patents and Trademarks